(12) United States Patent
Ellett et al.

(10) Patent No.: US 10,370,576 B2
(45) Date of Patent: Aug. 6, 2019

(54) POLYESTER FILM WITH ELECTRICAL INSULATION AND HEAT CONDUCTION PROPERTIES

(71) Applicant: DUPONT TEIJIN FILMS U.S. LIMITED PARTNERSHIP, Wilmington, DE (US)

(72) Inventors: Anna Ellett, Geraardsbergen (BE); Marianne Bausch-Koenig, Luxembourg (LU)

(73) Assignee: DUPONT TEIJIN FILMS U.S. LIMITED PARTNERSHIP, Wilmington, DE (US)

( * ) Notice: Subject to any disclaimer, the term of this patent is extended or adjusted under 35 U.S.C. 154(b) by 0 days.

(21) Appl. No.: 15/571,985

(22) PCT Filed: Apr. 27, 2016

(86) PCT No.: PCT/IB2016/052384
§ 371 (c)(1),
(2) Date: Nov. 6, 2017

(87) PCT Pub. No.: WO2016/178120
PCT Pub. Date: Nov. 10, 2016

(65) Prior Publication Data
US 2018/0134937 A1    May 17, 2018

(30) Foreign Application Priority Data
May 7, 2015   (EP) .................................... 15305700

(51) Int. Cl.
| | | |
|---|---|---|
| *C09K 5/14* | (2006.01) | |
| *C08K 3/38* | (2006.01) | |
| *C08J 5/18* | (2006.01) | |
| *C08G 63/183* | (2006.01) | |
| *B29C 71/02* | (2006.01) | |
| *B29C 55/16* | (2006.01) | |
| *B29C 55/14* | (2006.01) | |
| *B29C 55/12* | (2006.01) | |
| *B29C 55/00* | (2006.01) | |
| *B29K 67/00* | (2006.01) | |
| *B29K 509/00* | (2006.01) | |

(52) U.S. Cl.
CPC ................ *C09K 5/14* (2013.01); *B29C 55/12* (2013.01); *C08G 63/183* (2013.01); *C08J 5/18* (2013.01); *C08K 3/38* (2013.01); *B29C 55/005* (2013.01); *B29C 55/14* (2013.01); *B29C 55/16* (2013.01); *B29C 71/02* (2013.01); *B29C 2071/022* (2013.01); *B29K 2067/003* (2013.01); *B29K 2509/00* (2013.01); *C08J 2367/02* (2013.01); *C08K 2003/385* (2013.01); *C08K 2201/001* (2013.01)

(58) Field of Classification Search
CPC ........ C09K 5/14; C08G 63/183; B29C 55/12; B29C 71/02; B29C 2071/022; B29C 55/005; B29C 55/14; B29C 55/16; C08J 5/18; C08J 2367/02; C08K 3/38; C08K 2003/385; C08K 2201/001; B29K 2067/003; B29K 2509/00
See application file for complete search history.

(56) References Cited

U.S. PATENT DOCUMENTS

| | | |
|---|---|---|
| 3,890,421 A | 6/1975 | Habozit |
| 4,675,582 A | 6/1987 | Hommes et al. |
| 4,825,111 A | 4/1989 | Hommes et al. |
| 4,853,602 A | 8/1989 | Hommes et al. |
| 5,051,225 A | 9/1991 | Hommes et al. |
| 5,072,493 A | 12/1991 | Hommes et al. |
| 5,429,785 A | 7/1995 | Jolliffe |
| 5,885,501 A | 3/1999 | Gardner et al. |
| 7,494,704 B2 | 2/2009 | Massa et al. |
| 2011/0286185 A1* | 11/2011 | Abe ...................... H02M 7/003 361/710 |
| 2014/0127567 A1* | 5/2014 | Kuriki ................... H01G 11/42 429/211 |

FOREIGN PATENT DOCUMENTS

| | | |
|---|---|---|
| JP | 2011129759 A | 6/2011 |
| JP | 2011165792 A | 8/2011 |
| JP | 2013038179 A | 2/2013 |
| WO | 2014202649 A1 | 12/2014 |

OTHER PUBLICATIONS

International Search Report and Written Opinion for International Application No. PCT/IB2016/052384, dated Jul. 21, 2016, 11 pages.

International Preliminary Report on Patentability for International Application No. PCT/IB2016/052384, dated Nov. 7, 2017, 8 pages.

\* cited by examiner

*Primary Examiner* — Nathan L Van Sell
(74) *Attorney, Agent, or Firm* — Ratnerprestia (57) ABSTRACT

A biaxially stretched thermally conductive and electrically insulating film comprising a polyester forming a matrix and a plurality of anisotropic thermally conductive particles dispersed within the matrix and A process for manufacturing said biaxially stretched polyester film in which the dimension of the anisotropic filler particles with the highest thermal conductivity is oriented out of the film plane, thus conferring on said film improved thermal conductivity properties in the direction perpendicular to the film plane.

14 Claims, 2 Drawing Sheets

POLYESTER FILM WITH ELECTRICAL INSULATION AND HEAT CONDUCTION PROPERTIES

CROSS REFERENCE TO RELATED APPLICATIONS

This application is a National Phase filing of International Application No. PCT/IB2016/052384, filed on 27 Apr. 2016, and claims priority benefit of European Application No. EP 15305700.5, filed 7 May 2015, the entirety of which applications is incorporated herein by reference for all purposes.

FIELD OF THE INVENTION

The present invention belongs to the technical field of stretched polyester films exhibiting electrical insulation and heat conduction properties in the direction perpendicular to the film plane. It also belongs to the field of processes for manufacturing such films through continuous polymerisation and extrusion process.

TECHNICAL BACKGROUND

Continuous size reduction in motors and miniaturisation in electronic devices and systems in combination with increasing power result in an increase of the generated heat flux. There is therefore a need for better heat dissipation for efficiency, performance and reliability of these devices.

The growing importance of thermal management in machines and systems such as electrical motors, generators and transformers, electric vehicle batteries, electronics, telecoms, capacitors, lighting, wind turbines has brought the need to improve heat transfer for better heat removal.

There is a need for polyester film with electrical insulation and also improved thermal conductivity properties in order to provide a heat transfer path between components and therefore enable better heat dissipation. Non limiting applications include: slot, layer and phase insulation in electrical motors, generators, transformers; capacitor dielectrics, liner or substrates in electronic components and devices such as printed circuit boards, LEDs, thermal interface materials, thermally conductive tapes, pads, heat sinks, heat spreaders etc.

There is thus a need to provide biaxially stretched polyester films which combine electrical insulation and improved thermal conductivity properties with respect to known biaxially stretched polyester films, in particular with respect to biaxially oriented polyethylene terephthalate films, such as Mylar®, Melinex®, polyethylene naphthalate films, such as Teonex® and the like. More specifically, an increase in thermal conductivity in the direction perpendicular to the film plane is sought.

The addition of anisotropic particles with high thermal conductivity properties can effectively increase the thermal conductivity of such polyester films. However, biaxially stretching a film comprising a polymer matrix and anisotropic thermally conductive filler particles typically results in the orientation of said particles in a direction parallel to the film plane, as described in U.S. Pat. No. 7,494,704 B2, thus conferring an increase in thermal conductivity to the polyester film in the direction of the film plane. There is therefore also a need to provide a process for preparing a polyester film in which the anisotropic thermally conductive filler particles are not oriented in a direction parallel to the film plane, their addition resulting in increasing the thermal conductivity of said polyester film in the direction perpendicular to the film plane.

Document JP 2011-165792 discloses a multilayer biaxially stretched film comprising:
- a heat conductive layer comprising a fibrous carbon material
- one or two electrically insulating layers placed on one face or on each face of the heat conductive layer.

The weight of the fibrous carbon material preferably ranges from 20 to 30% of the weight of the heat conductive layer. At such a high content of carbon material, the heat conductive layer may not by itself exhibit electrical insulation properties. Therefore, the electrically insulating layer(s) is (are) placed on one face or on each face of the heat conductive layer in order to impart electrical insulation properties to the biaxially stretched film. The electrically insulating layer(s) may further contain filler particles in an amount of less than 1% by weight.

Document JP 2013-038179 discloses a biaxially stretched film comprising from 2 to 20 weight % of a fibrous carbon material. As in document JP 2011-165792, one or two electrically insulating layer(s) is (are) placed on one face or on each face of the biaxially stretched film in order to impart electrical insulation properties to the film. The electrically insulating layer(s) may further contain filler particles in an amount of less than 1% by weight.

These two documents disclose co-extruded films in which an electrically conductive layer is rendered insulating by the addition of one or two electrically insulating layer(s).

Document JP 2011-129759 discloses a film for reinforcing a flexible printed board circuit. This film is said to exhibit excellent heat dissipation properties. It is made of a polyethylene naphthalene (PEN) matrix in which filler particles are embedded. The filler particles are present in the matrix at a content ranging from 10 to 50%. The film is obtained through biaxially stretching.

SUMMARY OF THE INVENTION

The present invention relates to a biaxially stretched film exhibiting high electrical resistivity and improved thermal conductivity properties. By "high electrical resistivity", it is meant a film having a high electrical breakdown strength. This breakdown strength is determined by the onset of a current flow of 40 mA in a film sample subject to a 50 Hz AC voltage ramp increasing at a 500 V/s rate. This breakdown strength depends on the sample thickness. Typically, a biaxially stretched monolayer film having a thickness of 100 micron, according to the invention, exhibits a breakdown strength of at least 100 V/micron, more preferably of at least 125 V/micron.

The film according to the invention comprises:
  a polyester forming a matrix;
  a plurality of anisotropic primary filler particles dispersed within the matrix, said particles being selected from the group consisting of boron nitride, aluminum nitride, silicon carbide, silicon nitride, aluminum oxide, gallium nitride, gallium arsenide, gallium phosphide, zinc oxide, indium phosphide, beryllium oxide, magnesium oxide, silicon and mixtures thereof,
  wherein the particles are present in an amount ranging from 1.5 to 5 wt. % based on the total weight of the film, and
  wherein the plane or the principal axis of at least 20% of the primary filler particles forms an angle of from 20° to 90° with respect to the film plane, wherein the thermal conductivity of said film in the direction perpendicular to the film plane is at least 0.25 W/m·K.

In one embodiment, a plurality of secondary filler particles are dispersed within the matrix, said particles being selected from the group consisting of silicon dioxide, magnesium silicon nitride, zinc sulfide, zirconium oxides, boron phosphide, titanium dioxide, calcium carbonate, barium sulfate, talcs, clays and mixtures thereof, the secondary filler particles being present in an amount ranging from 0.1 to 20 wt. % based on the total weight of the film.

In one embodiment, the polyester is selected from the group consisting of polyethylene terephthalate (PET), polyethylene naphthalate (PEN), polyethylene isophthalate, polybutylene terephthalate (PBT), polybutylene isophthalate, polybutylene naphthalate, polytrimethylene terephthalate (PTT), polytrimethylene isophthalate, polytrimethylene naphthalate, poly(cyclohexylene-dimethanol-terephthalate (PCT), polymethylene 1,3-propylene terephthalate, polyhexamethylene terephthalate, polyisosorbide terephthalate (PEIT), polyhexamethylene naphthalate, polyarylates (Par) and copolymers thereof, preferably polyethylene terephthalate (PET) and copolymers thereof.

In one embodiment, the polyester is a homopolymer or a copolymer of polyethylene terephthalate (PET) and the primary filler particles are boron nitride particles.

One object of the invention is an electric motor comprising the biaxially stretched electrically insulating film.

The present invention also relates to a process for manufacturing a biaxially stretched polyester film, in which the dimension of the primary filler particles presenting the highest thermal conductivity is oriented away from the film plane, i.e. the plane or the principal axis of at least 20% of the primary filler particles forms an angle of from 20° to 90° with respect to the film plane. Thanks to extensive studies, the Applicant has determined the proper manufacturing process conditions which prevent the anisotropic particles' dimension with the highest thermal conductivity from being oriented in a direction parallel to the film plane. The process of the invention comprises the steps of:

a) providing a mixture of a molten polyester and anisotropic primary filler particles selected from the group consisting of boron nitride, aluminum nitride, silicon carbide, silicon nitride, aluminum oxide, gallium nitride, gallium arsenide, gallium phosphide, zinc oxide, indium phosphide, beryllium oxide, magnesium oxide, magnesium silicon nitride, silicon and mixtures thereof;

wherein the particles are present in an amount ranging from 1.5 to 5 wt. % based on the total weight of the mixture ;

b) feeding the mixture containing the polyester and the particles through a die to form a cast film;

c) heating the film at a temperature in the range of Tg+20° C. to Tg+80° C., where Tg is the glass transition temperature of the polyester measured through Differential Scanning Calorimetry at a scan rate of 20° C./min;

d) sequentially or simultaneously biaxially stretching the film in the MD direction and in the TD direction at a total stretching ratio of from 8 to less than 11 times.

In one embodiment, the process comprises after step d), step e) of annealing the film at a temperature in the range of Tm−80° C. to Tm−10° C., where Tm is the melting temperature of the polyester measured through Differential Scanning Calorimetry at a scan rate of 20° C./min.

In one embodiment, the mixture of step a) comprises secondary filler particles selected from the group consisting of silicon dioxide, zinc sulfide, zirconium oxides, boron phosphide, titanium dioxide, calcium carbonate, barium sulfate, talcs, clays and mixtures thereof, the secondary filler particles being present in an amount ranging from 0.1 to 20 wt. % based on the total weight of the mixture.

In one embodiment, the molten polyester of step a) is obtained through a continuous polymerization process.

In one embodiment, the filler particles are first mixed with ethylene glycol thereby forming a dispersion, said dispersion being mixed with polyester monomers. The polyester monomers are then subject to polymerization.

In one embodiment, step a) comprises the following substeps:

a-1) providing a polyester and anisotropic primary filler particles and optionally secondary filler particles;

a-2) mixing the polyester with the filler particles by applying heat and shear in an extruder.

In one embodiment, step a) comprises the following substeps:

a-1) providing a masterbatch in which the anisotropic primary filler particles and optionally the secondary filler particles are already incorporated and dispersed in the polyester;

a-2) mixing the masterbatch with a polyester by applying heat and shear in an extruder.

DETAILED DESCRIPTION OF THE INVENTION

The present invention relates to a biaxially stretched film obtained from a polyester in which a plurality of filler particles are dispersed. The polymer mixture is processed into a primary film which is then subjected to stretching. The process leading to the preparation of the biaxially stretched electrically insulating film according to the invention comprises the steps of:

Step a): providing a mixture of a molten polyester and primary and optionally secondary filler particles.

The primary filler particles have a high electrical resistivity of at least $10^5$ ohm·cm, preferably at least $10^7$ ohm·cm, more preferably at least $10^{10}$ ohm·cm and a thermal conductivity of at least about 30 W/m·K, preferably at least about 50 W/m·K. They are selected from the group consisting of boron nitride, aluminum nitride, silicon carbide, silicon nitride, aluminum oxide, synthetic diamond, gallium nitride, gallium arsenide, gallium phosphide, zinc oxide, indium phosphide, beryllium oxide, magnesium oxide, silicon, ceramic coated graphite, ceramic coated graphene and mixtures thereof.

The secondary filler particles have a high electrical resistivity which may be of at least $10^5$ ohm·cm, preferably at least $10^7$ ohm·cm, more preferably at least $10^{10}$ ohm·cm, and a thermal conductivity lower than 30 W/m·K. Non-limiting examples of said secondary filler particles include: silicon dioxide, magnesium silicon nitride, zinc sulfide, zirconium oxides, boron phosphide, titanium dioxide, calcium carbonate, barium sulfate, talcs, clays and mixtures thereof.

The primary filler particles are present in the mixture in an amount ranging from 0.1 to 10 wt. % based on the total weight of the mixture, preferably from 1.5 to 5 wt. %.

The secondary filler particles may be present in the mixture in an amount ranging from 0.1 to 20 wt. % based on the total weight of the mixture, preferably from 0.1 to 12 wt. %;

In one preferred embodiment, the mixture is devoid of any filler made of carbon, such as graphite, graphene, diamond, carbon fibers and carbon nanotubes.

Step b): feeding the mixture of step a) through a die to form a cast film;

Step c): heating the cast film at a temperature in the range of Tg+20° C. to Tg+80° C., preferably between Tg+30° C. and Tg+70° C., more preferably between Tg+40° C. and Tg+60° C. where Tg is the glass transition temperature of the polyester measured through Differential Scanning Calorimetry at a scan rate of 20° C./min;

Step d): sequentially or simultaneously biaxially stretching the film in both the machine direction MD and the transverse direction TD at a total stretching ratio lower than 11 times, preferably lower than 10 times and more preferably lower than 9 times.

In one embodiment, the total stretching ratio is at least 8 times.

In one embodiment, the total stretching ratio is at least 9 times.

In one embodiment, the total stretching ratio is at least 10 times.

In one embodiment, the total stretching ratio ranges from 8 to 10 times.

In a first embodiment of the invention, the biaxially stretched polyester film is produced using the continuous polymerisation process. The filler particles are mixed with monomers of polyester and polymerization of the monomers is carried out in presence of said particles. The melt containing the polyester and the particles is then transferred to a die in order to form a cast film. This embodiment allows continuously preparing a polyester mixed with the particles by continuously feeding the raw materials.

In a second embodiment of the invention, the biaxially stretched film is produced using the extrusion process. The filler particles and the polyester are fed to an extruder where they are exposed to heat and shear and where dispersing and homogenising of the mixture takes place. The extruder can be a single or a twin screw device. The mixture is then forced through a die in order to form a cast film.

In another embodiment, the masterbatching technique is used to provide the filler particles for the extrusion process. The particles are incorporated into the polyester matrix by applying heat and shear. The mixture is then shaped into granular form thus producing, upon cooling, a solid masterbatch of polyester with homogenously dispersed particles at relatively high concentration. During the extrusion process, the masterbatch and the polyester are melted and homogenously blended in an extruder. The mixture is then forced through a die in order to form a cast film.

1) Continuous Polymerization Process:

The first embodiment of the invention comprises step a) of providing a mixture of a polyester with particles selected from the group consisting of boron nitride, aluminum nitride, silicon carbide, silicon nitride, aluminum oxide, synthetic diamond, gallium nitride, gallium arsenide, gallium phosphide, zinc oxide, indium phosphide, beryllium oxide, magnesium oxide, magnesium silicon nitride, silicon, ceramic coated graphite, ceramic coated graphene or mixtures thereof, wherein the polyester is prepared in a continuous manner.

The polyester used in the present invention is a polymer produced by the polycondensation of a dicarboxylic acid and a diol. Inorganic and organic compounds are generally used to catalyse this reaction. The most common catalysts are antimony, germanium, titanium, zinc based compounds.

Non-limiting examples of said diol are ethylene glycol, diethylene glycol, triethylene glycol, tetramethylene glycol, propylene glycol, 1,2-propanediol, 1,3-propanediol, 1,4-butanediol, 1,5-pentanediol, 1,6-hexanediol, cyclohexanedimethanol and the like, and mixtures thereof.

Non-limiting examples of said dicarboxylic acid or its diester are terephthalic acid, naphthalic acid, phthalic acid, naphthalene dicarboxylic acid, adipic acid, sebacic acid, isosorbide acid and isophthalic acid and the like or diesters thereof.

Non-limiting examples of said polyester are polyethylene terephthalate (PET), polyethylene naphthalate (PEN), polyethylene isophthalate, polybutylene terephthalate (PBT), polybutylene isophthalate, polybutylene naphthalate, polytrimethylene terephthalate (PTT), polytrimethylene isophthalate, polytrimethylene naphthalate, poly(cyclohexylene-dimethanol-terephthalate (PCT), polymethylene 1,3-propylene terephthalate, polyhexamethylene terephthalate, polyisosorbide terephthalate (PEIT), polyhexamethylenenaphthalate, polyarylates (Par), and copolymers thereof.

In one embodiment, the polyester is polyethylene terephthalate (PET) and copolymers thereof.

Monomers of PET may be obtained either through direct esterification of ethylene glycol with terephthalic acid or through trans-esterification of ethylene glycol with dimethyl terephthalate. The product of the esterification and the trans-esterification process is then sent to a reactor where the poly-condensation process takes place.

The primary filler particles selected from the group of boron nitride, aluminum nitride, silicon carbide, silicon nitride, aluminum oxide, synthetic diamond, gallium nitride, gallium arsenide, gallium phosphide, zinc oxide, indium phosphide, beryllium oxide, magnesium oxide, silicon, ceramic coated graphite, ceramic coated graphene and mixtures thereof present variable degrees of thermal conductivity anisotropy as well as a geometric anisotropy, such that the dimension of the particle with the highest thermal conductivity coincides with the largest dimension of the particle. Such anisotropic filler particles are characterized by a specific aspect ratio. This aspect ratio is the ratio of the anisotropic filler particles' largest dimension to the anisotropic filler particles' smallest dimension. It is at least 5, preferably at least 10, more preferably at least 30. Preferably, the largest dimension of the anisotropic filler particles is below 50 μm, preferably below 10 μm, more preferably below 5 μm. The particles are present in an amount ranging from 0.1 to 10 wt. % based on the total weight of the mixture, preferably from 1.5 to 5 wt. %.

In one embodiment, the anisotropic particles are boron nitride particles. These particles exhibit a high geometric and thermal conductivity anisotropy. The thermal conductivity in the plane with the largest dimension, the basal plane, reaches up to 400 W/m·K, the thermal conductivity in the plane perpendicular to the basal plane being about 2 W/m·K.

In one embodiment, the diol is ethylene glycol. The filler particles may be first mixed with ethylene glycol thereby forming a dispersion, said dispersion being mixed with polyester monomers. Preferably, the filler particles are dispersed in said diol at a weight percentage ranging from about 10 to 70% with respect to the total weight of the dispersion.

The surface of the particles may not be functionalized. Preferably, the surface of the particles may be functionalized with hydroxyl groups or amine groups or carboxylic, sulfonic, phosphoric acid groups or silane groups, or titanate groups or ester groups or imine groups or phosphate groups or phosphonate groups or ammonium groups, alkylammonium groups and the like in order to facilitate their dispersion in said diol. Functionalization of the surfaces may be obtained through the use of wetting and dispersing additives known to the person skilled in the art.

Optionally, for cost reasons, secondary filler particles with lower thermal conductivity can be added to improve the overall thermal conductivity of the film. Non-limiting examples include: silicon dioxide, magnesium silicon nitride, zinc sulfide, zirconium oxides, boron phosphide, titanium dioxide, calcium carbonate, barium sulfate, talcs, clays and mixtures thereof.

The herein described polyester film may optionally contain, when appropriate, various additives. These include but are not limited to slip additives, color inhibitors, delusterants, dyeability modifiers, pigments and whiteners, antioxidants, flame retardants, radiation stabilizers, infra-red absorbers and ultraviolet light stabilizers or mixtures thereof. These additives may be added in the form of a powder, a liquid or a dispersion, in conventional amounts.

In step b), the mixture containing the polyester and the filler particles is forced through an extrusion die and then cooled below its melting point on a quench drum in order to obtain an amorphous cast film.

In step c), the cast film is generally preheated to a temperature of between 70° C. and 90° C. before it is biaxially stretched in subsequent step d).

In step d), the cast film is biaxially stretched (which is synonymous with biaxially oriented) in both the "machine direction" (MD) and the "transverse direction" (TD) at a temperature in the range of Tg+20° C. to Tg+80° C., preferably between Tg+30° C. and Tg+70° C., more preferably between Tg+40° C. and Tg+60° C. where Tg is the glass transition temperature of the polyester measured through Differential Scanning Calorimetry at a scan rate of 20° C./min. The stretching temperature in MD and in TD direction can be identical or different. "Machine direction" or longitudinal direction refers to the direction of film travel during extrusion. "Transverse direction" refers to a direction across the film, perpendicular to the machine direction. The step of biaxially stretching the film, which causes a two-directional orientation of the polymer chains, imparts improved mechanical properties to the film.

The cast film is biaxially stretched in both MD and TD direction by means of sequential or simultaneous stretching process. The most common way of stretching the cast film is through a sequential process, in which the film is first drawn in the machine direction and subsequently drawn in the transverse direction, i.e. orthogonally to the direction of travel, in separate heated ovens. It is also possible to draw the film in both MD and TD directions simultaneously in one heated oven. Such a process of simultaneously biaxially stretching has been described for example in U.S. Pat. No. 3,890,421. Reference is also made to the following patents: U.S. Pat. Nos. 4,675,582, 4,853,602, 4,825,111, 5,429,785, 5,885,501, 5,051,225,and 5,072,493, and to the LISIM® stretching method commercially available from Bruckner, which are incorporated herein by reference.

When the film is biaxially stretched through a sequential stretching process, it is first preheated and then stretched in the machine direction while exposed to heat in a Machine Direction Orienter. Once stretching in the machine direction is completed, the film is preheated again and then stretched in the transverse direction in a heated oven, the Transverse Direction Orienter. The preheating temperature before MD stretching can be different from the preheating temperature before TD stretching. The MD stretching temperature can be different from the TD stretching temperature. When the film is biaxially stretched through a simultaneous stretching process, the film is only preheated once and undergoes MD and TD stretching simultaneously in a heated oven.

According to the present invention, for any of the aforementioned stretching processes, the total stretching ratio is lower than 11 times, preferably lower than 10 times and more preferably lower than 9 times. The temperature at which stretching is carried out can be different between MD stretching and TD stretching. It ranges between Tg+20° C. to Tg+80° C., preferably between Tg+30° C. and Tg+70° C., more preferably between Tg+40° C. and Tg+60° C.

The obtained film thickness is typically in the range of 0.5-500 μm, preferably from 1.4 to 250 μm, more preferably from 12 to 250 μm, even more preferably from 50 to 250 μm.

In step e), once the biaxially stretching is completed, the stretched film generally undergoes a heat treatment, which causes the polymer to crystallize and imparts dimensional stability to the film. The film is heated under tension at a high temperature in the range of Tm−80° C. to Tm−10° C., where Tm is the melting temperature of the polyester measured through Differential Scanning Calorimetry at a scan rate of 20° C./min.

2) Polyester extrusion Process:

In the second embodiment of the invention, step a) comprises the following sub steps:

a-1) providing a polyester, generally in the form of granulates, and primary filler particles and optionally secondary filler particles Non-limiting examples of primary filler particles are boron nitride, aluminum nitride, silicon carbide, silicon nitride, aluminum oxide, synthetic diamond, gallium nitride, gallium arsenide, gallium phosphide, zinc oxide, indium phosphide, beryllium oxide, magnesium oxide, silicon, ceramic coated graphite, ceramic coated graphene and mixtures thereof.

Non-limiting examples of secondary filler particles include: silicon dioxide, magnesium silicon nitride, zinc sulfide, zirconium oxides, boron phosphide, titanium dioxide, calcium carbonate, barium sulfate, talcs, clays and mixtures thereof.

a-2) mixing the polyester with said filler particles by applying heat and shear in an extruder.

Alternatively, the masterbatching process can be used. It comprises the following steps:

a-1) providing a masterbatch consisting of a polyester, generally in a granulate form, in which the anisotropic primary filler particles and optionally and the secondary filler particles are dispersed at a high concentration, said concentration ranging generally between 15 and 80 wt. % based on the total weight of the masterbatch, preferably between 20 and 60 wt. % a-2) mixing the masterbatch with a polyester by applying heat and shear in an extruder;

Steps b), c), d) and e) of this second embodiment are identical to steps b), c) d) and e) disclosed in relation to the first embodiment.

Optionally, after step e) in both the first and the second embodiment, the biaxially stretched film may undergo step f) of relaxation, during which it is heated in an unconstrained condition so that it is free to shrink. The size reduction is generally less than 8%, typically from 1 to 4% and more typically from 2 to 3% in MD and TD direction. The relaxation temperature may range between Tm–20° C. and Tm–160° C., where Tm is the melting temperature of the polyester.

3) Structure of the resulting biaxially stretched film:

The structure of a biaxially stretched film prepared through a continuous polymerization process (first embodiment) or through a polyester extrusion process (second embodiment) is characterized by a polyester matrix, in which a plurality of primary anisotropic particles are embedded, said particles being present in an amount ranging from 0.1 to 10 wt. % based on the total weight of the film, preferably from 1.5 to 5 wt. %, and wherein the dimension of the primary filler particles with the highest thermal conductivity is not aligned in a direction parallel to the film plane.

The primary particles may be flake, rod, fiber, whisker, agglomerate, platelet, needle, spheroid, granular, disk, aggregate, nano-tube, nano-ribbon, nano-fiber, nano-sheet shaped.

The particles present variable degrees of thermal conductivity anisotropy. In the case that the anisotropic filler particles are flake, platelet, disk, spheroid, granular, aggregate, and the like, said particles are defined as type P1 particles (see FIG. 1). The dimension with the highest thermal conductivity coincides with the plane of said particles formed by the major and minor axis of type P1 particles. The dimension with the highest thermal conductivity of type P1 particles will be referred to as the "plane of the particles" hereinafter.

Figure 1:
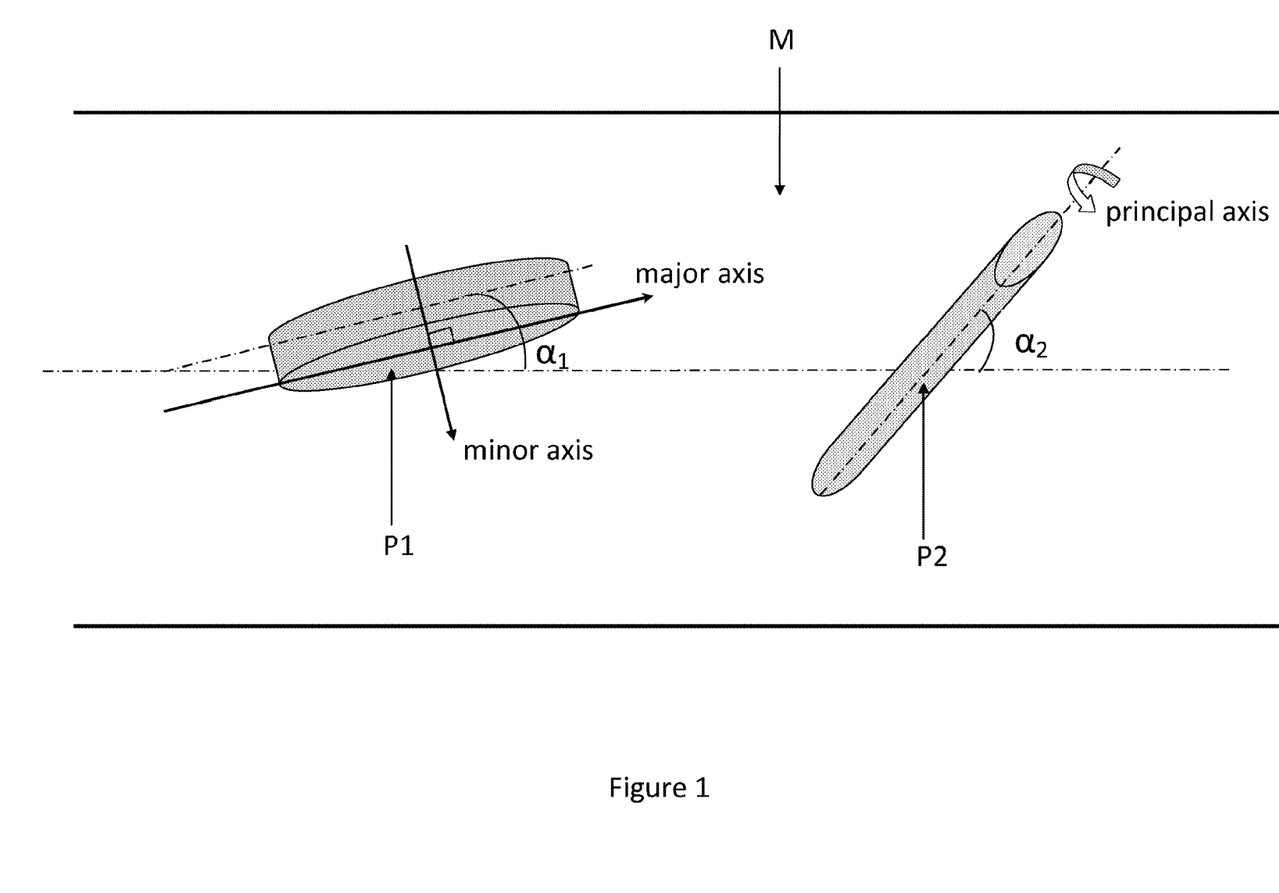
FIG. 1 is a schematic diagram illustrating the typical orientation of the different anisotropic filler particles shape types in the polymer matrix.

In the case that the anisotropic filler particles are a needle, a rod, a fiber, a whisker, a tube and the like, said particles are defined as type P2 particles (see FIG. 1). The dimension with the highest thermal conductivity coincides with the axis of rotational symmetry, the principal axis, such that said axis is defined by the largest dimension of the particle. The dimension with the highest thermal conductivity of type P2 particles will be referred to as the "the principal axis of the particles" hereinafter.

In the context of the present invention, the primary filler particles are said to be "oriented out of the film plane" such that for type P1 particles, the plane of the particles and for type P2 particles, the principal axis of the particles forms an angle of between 1 and 90° with the film plane. Preferably the plane of P1 particles and the principal axis of P2 particles of at least 20% of said particles form an angle of at least 20° with the film plane. More preferably the plane of P1 particles and the principal axis of P2 particles of at least 25% of said particles form an angle of at least 30° with the film plane. Even more preferably the plane of P1 particles and the principal axis of P2 particles at least 25% of said particles forms an angle of at least 45° with the film plane.

FIG. 1 is a schematic diagram illustrating the orientation within the polyester film of the different shape types of anisotropic filler particles. M denotes the polyester matrix. P1 and P2 denote the anisotropic filler particles. α1 and α2 indicate the angle formed between the film plane and the plane of the particle P1 and the angle formed between the film plane and the principle axis of the particle P2 respectively.

The orientation of the anisotropic filler particles in the polymeric matrix may be assessed by wide-angle X-ray diffraction technique, known to the person skilled in the art, using X-ray diffraction instruments commercially available from companies such as Rigaku Corporation or Bruker Corporation.

The orientation of the anisotropic filler particles in the polymeric matrix may also be assessed by transmission electron microscopy (TEM) investigation of the transversal section of the film, followed by computer-assisted image analysis. Preparation methods of polymeric film samples for TEM imaging are known to the person skilled in the art. An appropriate preparation method may consist in embedding a sample of interest in epoxy resin and reducing said sample to an ultra-thin section, typically less than 100 nm in thickness. The Cryo-ultramicrotomy method may be used for sample sectioning since it allows the preparation of ultra-thin polymer samples. The obtained ultra-thin sections may be placed on a grid sample holder for manipulation on the TEM stage. TEM images with a field of about 30×30 µm may be acquired using a high resolution TEM instrument linked to a CCD camera commercially available from companies such as JEOL ltd., FEI Company and Hitachi High-Technologies Corporation. Images may be analysed using an image analysis software such as ImageJ a public domain image processing programme or analySIS commercially available from Olympus Corporation.

The orientation of the particles within the matrix allows increasing the thermal conductivity by at least 10% in the direction perpendicular to the film plane, more preferably 15%, more preferably 20%, and more preferably 30%, in comparison with a polyester film devoid of any thermally conductive particles, such as a Mylar®, Melinex®, Teonex® or the like.

According to one preferred embodiment, the biaxially stretched electrically insulating film is a monolayer film. The monolayer film combines both electrical insulation and heat conduction properties.

It is known that when a polymeric film containing geometric anisotropic filler particles is biaxially stretched, the geometric anisotropic filler particles tend to orientate preferentially in a direction parallel to the film plane (U.S. Pat. No. 7,494,704 B2). But geometric anisotropic particles presenting thermal conductivity anisotropy, which plane with the highest thermal conductivity is oriented in the direction parallel to the film plane, have a negligible contribution to the increase in thermal conductivity in the direction perpendicular to the film plane. Until now, it was difficult to prepare a biaxially stretched film comprising thermally conductive and geometric anisotropic filler particles in a matrix resin in which the plane with the largest dimension of said particles is not oriented in a direction parallel to the film plane. Thanks to extensive studies, the Applicant has determined the proper manufacturing process conditions which prevent the anisotropic filler particles from being oriented in a direction parallel to the film plane. It was found notably by the Applicant that:

a stretching temperature in the range of Tg+20° C. to Tg+80° C., preferably between Tg+30° C. and Tg+70° C., more preferably between Tg+40° C. and Tg+60° C., and a total stretching ratio in the MD and in the TD direction lower than 11 times, preferably lower than 10 times and more preferably lower than 9 times are beneficial in preventing the dimension of the anisotropic filler particles with the largest dimension from being oriented in a direction which is parallel to the film plane.

EXAMPLES

The following examples are illustrative of the invention, and should not be considered as limiting. The examples also comprise what is considered to be the best mode of the invention.

1) Reference Example 1

A polyethylene terephthalate (PET), having an intrinsic viscosity (IV) of 0.62 dl/g measured in a mixture of tetrachloroethane (TCE)/phenol is prepared by continuous polymerization. A cast film of said PET is obtained by extrusion through a slot die system and by cooling said PET on a quench drum. The cast film is preheated above its glass transition temperature before it is subjected to machine direction stretching using heated rollers in a Machine Direction Orienter at a temperature of 95° C. The machine direction stretched film is subsequently preheated above its glass transition temperature before it is stretched in the transverse direction at 120° C. in a heated oven, the Transverse Direction Orienter, in which the biaxially stretched film is subsequently subjected to a heat treatment. The biaxially stretched film obtained is about 100 µm thick. The said film has a thermal conductivity of 0.23 W/m·K.

The thermal conductivity, expressed in W/m·K, is measured between 60° C. and 100° C. at a pressure of 2 MPa on the TIMA (Thermal Interface Materials)-Tester from Berliner Nanotest and Design GmbH. The TIMA-Tester uses a steady state method for measuring R, the thermal resistance expressed in K·m$^2$/W, of thermal conductors. The thermal conductivity ($\lambda$), expressed in W/m·K, is calculated using the measured average thickness of the film and its thermal resistance according the following formulae:

$$\lambda = d/R$$

where:
d is the measured average thickness of the film [m]
R is the measured thermal resistance [m$^2$·K/W].

An increase in the thermal conductivity of at least 10% in the direction perpendicular to the film plane, more preferably 15%, more preferably 20%, and more preferably 30%, in the direction perpendicular to the film plane in comparison with a reference polyester film devoid of any thermally conductive particles, such as said PET film produced according to Reference Example 1 is sought. The measured thermal conductivities of the films produced according to the following examples were compared to that of the reference film produced according to Reference Example 1, said film being made of PET and devoid of any thermally conductive particles. The said thermal conductivity increase of each film is indicated in Table 1.

2) Example 2

A polyethylene terephthalate (PET), having an intrinsic viscosity (IV) of 0.627 dl/g measured in a mixture of tetrachloroethane (TCE)/phenol is mixed with boron nitride particles available under the trade name S1-SF from ESK ceramics GmbH in a twin screw extruder. The BN particles/ PET weight ratio in the polymeric mixture is maintained at 1.6/98.4. A cast film is obtained by forming the polymeric mixture through a slot die system and by cooling said polymeric mixture on a quench drum. The cast film is subjected to biaxial sequential stretching on a laboratory stretcher (commercially available from companies such as Brueckner, T.M Long or Inventure laboratory). The cast film is stretched sequentially in the machine and in the transverse direction at 120° C. at a total stretching ratio of 9 times. The stretched film obtained was subjected to a heat-set treatment. The biaxially stretched film obtained is about 205 µm thick. The thermal conductivity and the relevant process conditions of said film are indicated in Table 1.

3) Example 3

A cast film of polyethylene terephthalate containing boron nitride particles with a weight ratio PET/BN of 98.4/1.6 respectively is prepared in a similar way as in example 2. The said cast film is subjected to biaxial sequential stretching on a laboratory stretcher (commercially available from companies such as Brueckner, T.M Long or Inventure laboratory). The cast film is stretched sequentially in the machine and in the transverse direction at 120° C. at a total stretching ratio of 9 times. The stretched film obtained was subjected to a heat-set treatment. The biaxially stretched film obtained is about 230 µm thick. The thermal conductivity and the relevant process conditions of said film are indicated in Table 1.

4) Example 4

A cast film of polyethylene terephthalate containing boron nitride particles with a weight ratio PET/BN of 98.4/1.6 respectively is prepared in a similar way as in example 2. The said cast film is subjected to biaxial sequential stretching on a laboratory stretcher (commercially available from companies such as Brueckner, T.M Long or Inventure laboratory). The cast film is stretched sequentially in the machine and in the transverse direction at 120° C. at a total stretching ratio of 9 times. The stretched film obtained was subjected to a heat-set treatment. The biaxially stretched film obtained is about 120 µm thick. The thermal conductivity and the relevant process conditions of said film are indicated in Table 1.

5) Example 5

A dispersion of boron nitride particles available under the trade name S1-SF from ESK ceramics GmbH was prepared in Monoethyleneglycol (MEG). The weight ratio of boron nitride particles was 13% of the total weight of said dispersion. The said dispersion was mixed with monomers of a polyethylene terephthalate (PET), having an intrinsic viscosity (IV) of 0.62 dl/g measured in a mixture of tetrachloroethane (TCE)/phenol, with a weight ratio 40/60 respectively. The said PET monomer/BN/MEG mixture was fed continuously to a prepolymerizer to form a PET prepolymer containing boron nitride particles. The said prepolymer mixture is fed to a final polymerizer and is polymerized in the final polymerizer to form a higher molecular weight polyethylene terephthalate containing boron nitride particles, at a weight ratio of 1.6% based on the total weight of the polymeric mixture. A cast film of said polymeric mixture is obtained by extrusion through a slot die system and by cooling said polymeric mixture on a quench drum. The said cast film is subjected to biaxial sequential stretching on a laboratory stretcher (commercially available from companies such as Brueckner, T.M Long or Inventure laboratory). The cast film is stretched sequentially in the machine and in the transverse direction at 110° C. at a total stretching ratio of 8 times. The stretched film obtained was subjected to a heat-set treatment. The biaxially stretched film obtained is about 135 µm thick. The thermal conductivity and the relevant process conditions of said film are indicated in Table 1.

6) Example 6

A polyethylene terephthalate containing boron nitride particles, at a weight ratio of 1.6% based on the total weight of the polymeric mixture was prepared by continuous polymerization in a similar way as in Example 5. A cast film of said PET is obtained by extrusion through a slot die system and by cooling said PET on a quench drum. The said cast film is subjected to biaxial sequential stretching on a laboratory stretcher (commercially available from companies such as Brueckner, T.M Long or Inventure laboratory). The cast film is stretched sequentially in the machine and in the transverse direction at 110° C. at a total stretching ratio of 8 times. The stretched film obtained was subjected to a heat-set treatment. The biaxially stretched film obtained is about 135 µm thick. The thermal conductivity and the relevant process conditions of said film are indicated in Table 1.

7) Example 7

A polyethylene terephthalate containing boron nitride particles, at a weight ratio of 1.6% based on the total weight of the polymeric mixture is prepared by continuous polymerization in a similar way as in Example 5. A cast film of said polymeric mixture is obtained by extrusion through a slot die system and by cooling said polymeric mixture on a quench drum. The cast film is preheated above its glass transition temperature before it is subjected to machine direction stretching using heated rollers in a Machine Direction Orienter at a temperature of 105° C. The machine direction stretched film is subsequently preheated above its glass transition temperature before it is stretched in the transverse direction at 120° C. in a heated oven, the Transverse Direction Orienter, in which the biaxially stretched film is subsequently subjected to a heat-set treatment. The biaxially stretched film obtained is about 100 µm thick. The thermal conductivity and the relevant process conditions of said film are indicated in Table 1.

8) Comparative Example 8

A cast film of polyethylene terephthalate containing boron nitride particles with a weight ratio PET/BN of 98.4/1.6 respectively is prepared in a similar way as in example 3. The cast film is preheated above its glass transition temperature before it is subjected to machine direction stretching using heated rollers in a Machine Direction Orienter at a temperature of 100° C. The machine direction stretched film is subsequently subjected to transverse direction stretching at 110° C. on a laboratory stretcher, the total stretching ratio of the stretched film being 11 times. The stretched film obtained was subjected to a heat-set treatment. The biaxially stretched film obtained is about 150 µm thick. The thermal conductivity and the relevant process conditions of said film are indicated in Table 1.

9) Comparative Example 9

A polyethylene terephthalate containing boron nitride particles, at a weight ratio of 1.6% based on the total weight of the polymeric mixture is prepared by continuous polymerization in a similar way as in Example 5. A cast film of said polymeric mixture is obtained by extrusion through a slot die system and by cooling said polymeric mixture on a quench drum. The cast film is preheated above its glass transition temperature before it is subjected to machine direction stretching using heated rollers in a Machine Direction Orienter at a temperature of 100° C. The machine direction stretched film is subsequently preheated above its glass transition temperature before it is stretched in the transverse direction at 120° C. in a heated oven, the Transverse Direction Orienter, in which the biaxially stretched film is subsequently subjected to a heat treatment. The biaxially stretched film obtained is about 100 µm thick. The thermal conductivity and the relevant process conditions of said film are indicated in Table 1.

| Example | BN concentration (wt %) | Thickness (um) | Stretch ratio | T MD stretching (° C.) | T TD stretching (° C.) | λ-film [W/mK] | Thermal conductivity increase (%) |
|---|---|---|---|---|---|---|---|
| 1* | 0 | 100 | — | 95 | 120 | 0.23 | — |
| 2 | 1.6 | 205 | 9 | 120 | 120 | 0.31 | 35 |
| 3 | 1.6 | 230 | 9 | 120 | 120 | 0.32 | 39 |
| 4 | 1.6 | 120 | 9 | 120 | 120 | 0.30 | 30 |
| 5 | 1.6 | 135 | 8 | 110 | 110 | 0.35 | 52 |
| 6 | 1.6 | 135 | 8 | 110 | 110 | 0.34 | 48 |
| 7 | 1.6 | 100 | 8 | 105 | 120 | 0.26 | 13 |
| 8** | 1.6 | 150 | 11 | 100 | 110 | 0.23 | 0 |
| 9** | 1.6 | 100 | 12 | 95 | 120 | 0.23 | 0 |

*Reference
**Comparative

Table 1 summarizes the thermal conductivity measurements results and the relevant process conditions of the different types of films prepared according to the above examples The biaxially stretched films of Examples 2 to 7 produced either through a continuous polymerisation process or through an extrusion process exhibit a thermal conductivity of between 0.26 and 0.35 W/m·K, thus representing a thermal conductivity increase compared to that of the reference PET film devoid of any thermally conductive particles prepared according to reference example 1 ranging between 13 and 52%.

In contrast, the biaxially stretched films of Comparative Examples 8 and 9 produced either through a continuous polymerisation process or through an extrusion process exhibit a thermal conductivity of 0.23 W/m·K, which represents no improvement with respect to the reference PET film prepared according to reference example 1.

Figure 2:
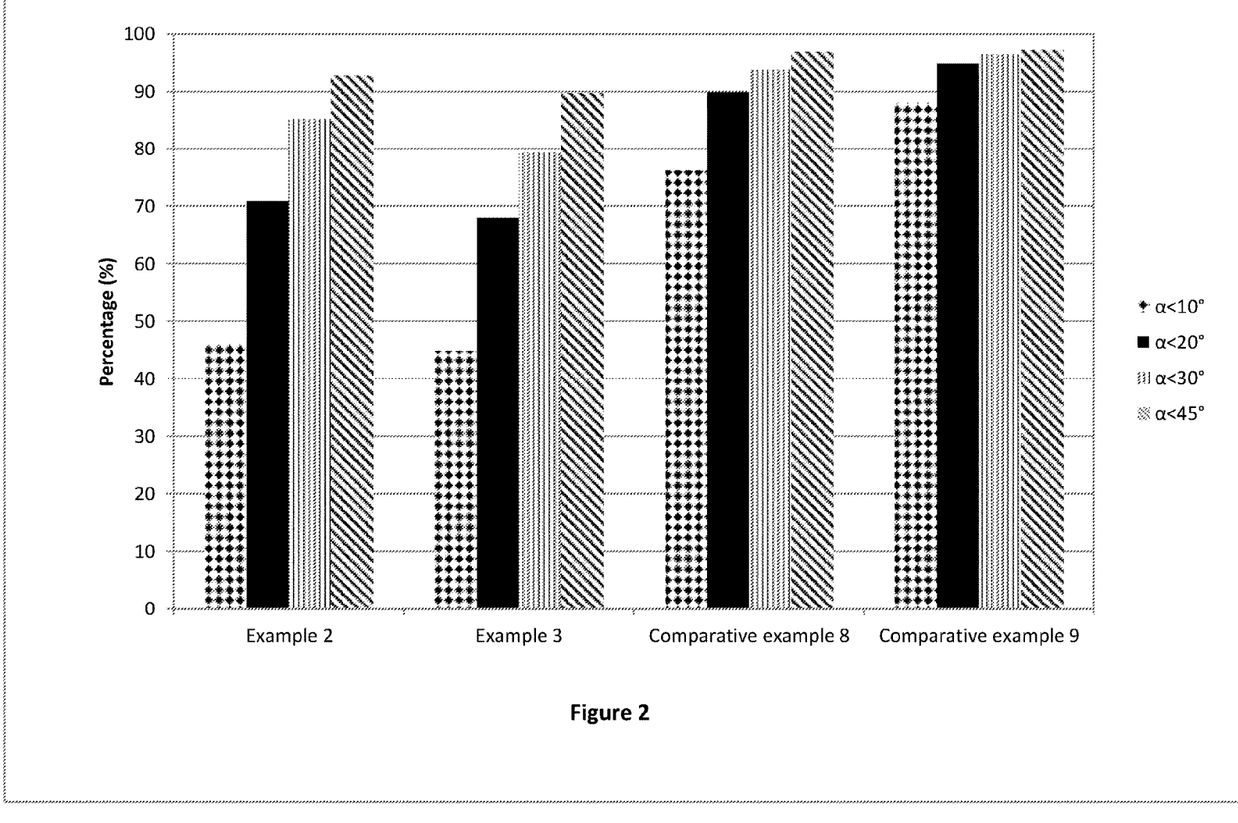
FIG. 2 shows the distribution of the angles between the basal plane of the anisotropic filler particle and the film plane for examples 2, 3 and Comparative examples 8 and 9.

Samples from Example 2, Example 3, Comparative Examples 8 and 9 were embedded in epoxy resin. Each embedded sample was trimmed using a rotating trimming tool (Leica EM TRIM). Ultra-thin transversal sections of 80 nm in thickness of the film in the plane perpendicular to the film plane were prepared using ultramicrotomy (LEICA Ultracut) at room temperature with the use of a diamond blade knife (diatome 45° knife). The sections were placed on copper grids (Agar G2200C, 200 Mesh). High resolution TEM images showing the anisotropic particle distribution in the transversal section of the film were obtained, said images allowing the determination by image analysis of a, the angle between the basal plane of the anisotropic filler particle and the film plane. FIG. 2 shows the distribution of the angles between the basal plane of the anisotropic filler particles and the film plane for examples 2, 3 and Comparative examples 8 and 9.

Table 2 below indicates the percentage of primary filler particles for which the angle between the basal plane of the particles and the film plane is higher than 20°.

TABLE 2

| | Percentage of primary particles forming an angle of more than 20° with respect to the film plane |
|---|---|
| Example 2 | 29% |
| Example 3 | 32% |
| Comparative example 8 | 10% |
| Comparative example 9 | 5% |

Table 2 shows on the one hand that for the films produced according to Examples 2 and 3 and which exhibit an increase in thermal conductivity of 35% and 39% respectively, more than 20% of the primary filler particles are oriented out of the film plane, the basal plane of more than 20% of the primary particles forming an angle of more than 20° with respect to the film plane. On the other hand for the films produced according to Comparative examples 8 and 9 and for which no thermal conductivity improvement is observed, the basal plane of less than 20% of the primary filler particles forms an angle of more than 20° with respect to the film plane.

The invention claimed is:

1. A biaxially stretched electrically insulating monolayer film exhibiting both electrical insulation and heat conduction properties, said film comprising:
 a polyester forming a matrix;
 a plurality of anisotropic primary filler particles dispersed within the matrix, said particles being selected from the group consisting of boron nitride, aluminum nitride, silicon carbide, silicon nitride, aluminum oxide, gallium nitride, gallium arsenide, gallium phosphide, zinc oxide, indium phosphide, beryllium oxide, magnesium oxide, silicon, and mixtures thereof;
 wherein the film is devoid of any carbon fibers;
 wherein the particles are present in an amount ranging from 1.5 to 5 wt. % based on the total weight of the film, and
 wherein the plane or the principal axis of at least 20% of the primary filler particles forms an angle of from 20° to 90° with respect to the film plane,
 wherein the thermal conductivity of said film in the direction perpendicular to the film plane is at least 0.25 W/m·K.

2. The biaxially stretched electrically insulating film of claim 1, in which a plurality of secondary filler particles are dispersed within the matrix, said particles being selected from the group consisting of silicon dioxide, magnesium silicon nitride, zinc sulfide, zirconium oxides, boron phosphide, titanium dioxide, calcium carbonate, barium sulfate, talcs, clays and mixtures thereof,
 wherein the secondary filler particles are present in an amount ranging from 0.1 to 20 wt. % based on the total weight of the film.

3. The biaxially stretched electrically insulating film according to claim 1, wherein the polyester is selected from the group consisting of polyethylene terephthalate (PET), polyethylene naphthalate (PEN), polyethylene isophthalate, polybutylene terephthalate (PBT), polybutylene isophthalate, polybutylene naphthalate, polytrimethylene terephthalate (PTT), polytrimethylene isophthalate, polytrimethylene naphthalate, poly(cyclohexylene-dimethanol-terephthalate (PCT), polymethylene 1,3-propylene terephthalate, polyhexamethylene terephthalate, polyisosorbide terephthalate (PEIT), polyhexamethylene naphthalate, polyarylates (Par) and copolymers thereof, preferably polyethylene terephthalate (PET) and copolymers thereof.

4. The biaxially stretched electrically insulating film according to claim 1, wherein the polyester is a homopolymer or a copolymer of polyethylene terephthalate (PET) and the primary filler particles are boron nitride particles.

5. An electric motor comprising the biaxially stretched electrically insulating film according to claim 1.

6. The biaxially stretched electrically insulating film according to claim 1, which is devoid of any filler selected from the group consisting of graphite, graphene, diamond and carbon nanotubes.

7. The biaxially stretched electrically insulating film according to claim 1, which is devoid of any filler made of carbon.

8. A process for the preparation of the biaxially stretched electrically insulating monolayer film according to claim 1, said process comprising the steps of:
 a) providing a mixture of a molten polyester and anisotropic primary filler particles selected from the group consisting of boron nitride, aluminum nitride, silicon carbide, silicon nitride, aluminum oxide, gallium nitride, gallium arsenide, gallium phosphide, zinc oxide, indium phosphide, beryllium oxide, magnesium oxide, magnesium silicon nitride, silicon and mixtures thereof;
 wherein the particles are present in an amount ranging from 1.5 to 5 wt. % based on the total weight of the mixture;
 b) feeding the mixture containing the polyester and the particles through a die to form a cast film;
 c) heating the film at a temperature in the range of Tg+20° C. to Tg+80° C., where Tg is the glass transition temperature of the polyester measured through Differential Scanning Calorimetry at a scan rate of 20° C./min;
 d) sequentially or simultaneously biaxially stretching the film in the MD direction and in the TD direction at a total stretching ratio of from 8 to less than 11 times.

9. The process according to claim 8, comprising after step d), step e) of annealing the film at a temperature in the range of Tm−80° C. to Tm−10° C., where Tm is the melting temperature of the polyester measured through Differential Scanning Calorimetry at a scan rate of 20° C./min.

10. The process according to claim 8, wherein the mixture of step a) comprises secondary filler particles selected from the group consisting of silicon dioxide, zinc sulfide, zirconium oxides, boron phosphide, titanium dioxide, calcium carbonate, barium sulfate, talcs, clays and mixtures thereof, wherein the secondary filler particles are present in an amount ranging from 0.1 to 20 wt. % based on the total weight of the mixture.

11. The process according to claim 8, wherein the molten polyester of step a) is obtained through a continuous polymerization process.

12. The process according to claim 11, wherein the filler particles are first mixed with ethylene glycol thereby forming a dispersion, said dispersion being mixed with polyester monomers.

13. The process according to claim 8, wherein step a) comprises the following substeps:
   a-1) providing a polyester and anisotropic primary filler particles and optionally secondary filler particles;
   a-2) mixing the polyester with the filler particles by applying heat and shear in an extruder.

14. The process according to claim 8, wherein step a) comprises the following substeps:
   a-1) providing a masterbatch in which the anisotropic primary filler particles and optionally the secondary filler particles are already incorporated and dispersed in the polyester;
   a-2) mixing the masterbatch with a polyester by applying heat and shear in an extruder.

* * * * *